US011884085B2

(12) United States Patent
Suzuki

(10) Patent No.: US 11,884,085 B2
(45) Date of Patent: Jan. 30, 2024

(54) RECORDING DEVICE

(71) Applicant: SEIKO EPSON CORPORATION, Tokyo (JP)

(72) Inventor: Nobutaka Suzuki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 7 days.

(21) Appl. No.: 17/650,924

(22) Filed: Feb. 14, 2022

(65) Prior Publication Data

US 2022/0258507 A1 Aug. 18, 2022

(30) Foreign Application Priority Data

Feb. 15, 2021 (JP) ................................ 2021-021506

(51) Int. Cl.
*B41J 29/38* (2006.01)
*B41J 25/308* (2006.01)
*B65H 5/06* (2006.01)

(52) U.S. Cl.
CPC ............. *B41J 29/38* (2013.01); *B65H 5/062* (2013.01)

(58) Field of Classification Search
CPC ................................ B41J 29/38; B41J 25/308
See application file for complete search history.

(56) References Cited

U.S. PATENT DOCUMENTS 4,804,285 A 2/1989 Bradford
2007/0115340 A1 * 5/2007 Tanabe ............... G03G 21/1839 347/118
2012/0070217 A1 * 3/2012 Hendricks ............ B41J 2/16585 400/352
2020/0377323 A1 12/2020 Nakahata et al.

FOREIGN PATENT DOCUMENTS

JP 2012158036 A 8/2012

OTHER PUBLICATIONS

Office Action for EP Patent Application No. EP22156508.8, dated Jun. 23, 2022, 7 pages of Office Action.

* cited by examiner

*Primary Examiner* — Jason S Uhlenhake
(74) *Attorney, Agent, or Firm* — CHIP LAW GROUP

(57) ABSTRACT

A recording device includes a transportation path that transports a medium, a recording portion configured to move with respect to the transportation path in a direction intersecting with a recording surface of the medium, a moving mechanism that moves the recording portion, and a motor that causes the recording portion to move, and the moving mechanism includes a first member on which a first rack is formed in a moving direction of the recording portion, a first pinion gear that is engaged with the first rack, a second rack that is provided at a position facing the first rack in the recording portion, formed in the moving direction, and engaged with the first pinion gear, and a second member in which the first pinion gear is rotatably provided that is configured to move in the moving direction by receiving the power of the motor.

17 Claims, 13 Drawing Sheets

RECORDING DEVICE

The present application is based on, and claims priority from JP Application Serial Number 2021-021506, filed Feb. 15, 2021, the disclosure of which is hereby incorporated by reference herein in its entirety.

BACKGROUND

1. Technical Field

The present disclosure relates to a recording device for performing recording on a medium.

2. Related Art

JP-A-2012-158036 discloses a recording device in which an ink jet head is configured to ascend or descend with respect to a platen by a rack and pinion mechanism.

In the configuration described in JP-A-2012-158036, for increasing the moving area of the ink jet head, the length of the rack needs to be increased, as a result of which the size of the rack and pinion mechanism increases and the size of the entire device also increases.

SUMMARY

The present disclosure is a recording device including a transportation path that transports a medium, a recording portion configured to move with respect to the transportation path in a direction intersecting with a recording surface of the medium, a moving mechanism that moves the recording portion, and a motor that causes the recording portion to move by transferring power to the moving mechanism, in which the moving mechanism includes a first member on which a first rack is formed in a moving direction of the recording portion, a first pinion gear that is engaged with the first rack, a second rack that is provided at a position facing the first rack in the recording portion, formed in the moving direction of the recording portion, and engaged with the first pinion gear, and a second member in which the first pinion gear is rotatably provided that is configured to move in the moving direction by receiving the power of the motor.

DESCRIPTION OF EXEMPLARY EMBODIMENTS

Figure 1:
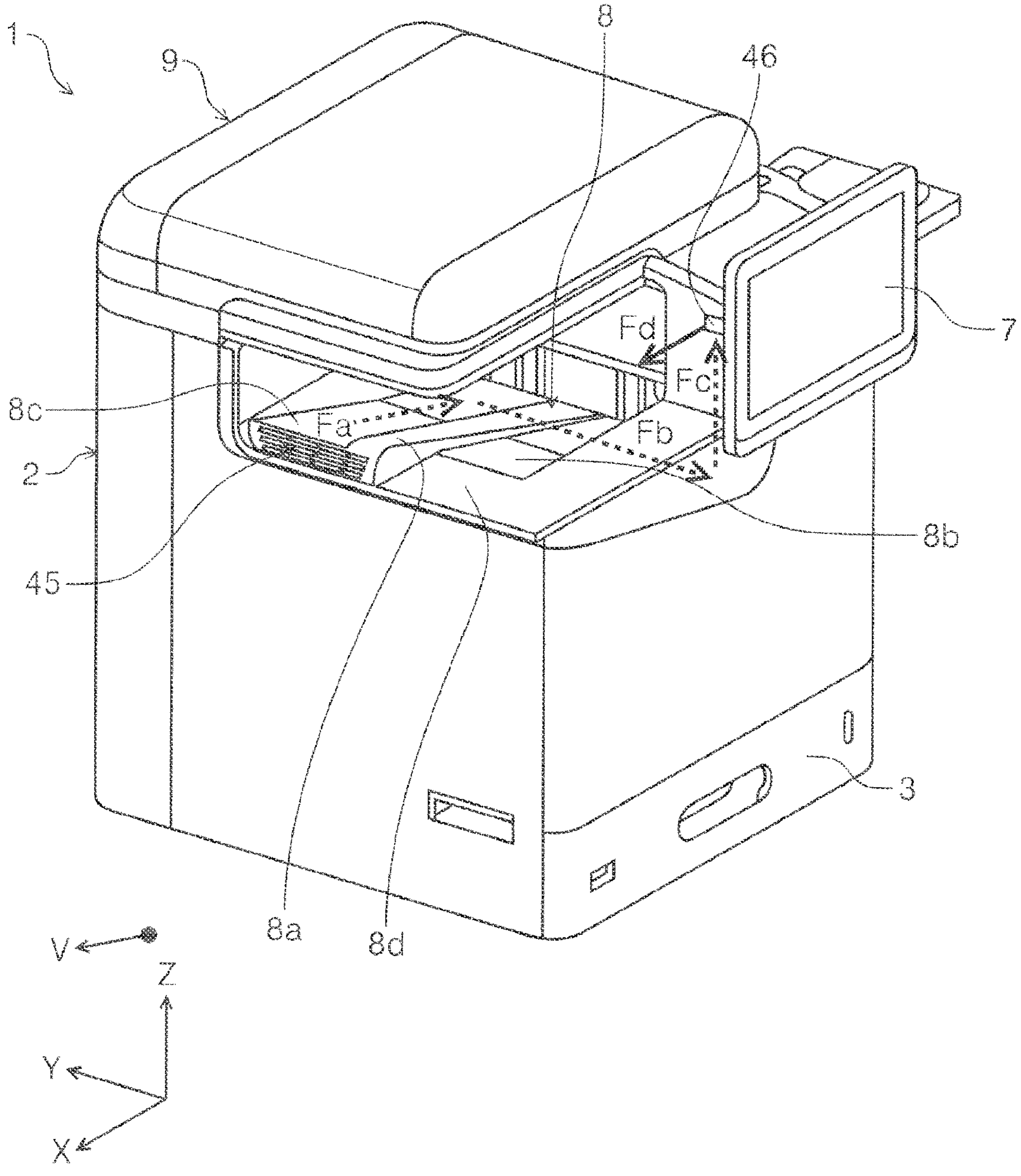
FIG. 1 is an external perspective view of a printer.

Hereinafter, the present disclosure will be schematically described. A recording device according to the first aspect includes a transportation path that transports a medium, a recording portion configured to move with respect to the transportation path in a direction intersecting with a recording surface of the medium, a moving mechanism that moves the recording portion, and a motor that causes the recording portion to move by transferring power to the moving mechanism, and the moving mechanism includes a first member on which a first rack is formed in a moving direction of the recording portion, a first pinion gear that is engaged with the first rack, a second rack that is provided at a position facing the first rack in the recording portion, formed in the moving direction of the recording portion, and engaged with the first pinion gear, and a second member in which the first pinion gear is rotatably provided that is configured to move in the moving direction by receiving the power of the motor.

According to this aspect, since, when the second member moves in the moving direction, the first pinion gear provided in the second member is engaged with the first rack and rotates, and the rotation of the first pinion gear causes the second rack, that is, the recording portion to move, the moving amount of the recording portion becomes larger than the moving amount of the second member. In other word, the moving amount of the recording portion can be ensured while the moving amount of the second member is restricted. Therefore, the size of a mechanism for moving the second member can be suppressed from being increased, and the size of the device can also be suppressed from being increased.

According to the second aspect, in the first aspect, the second rack is provided on a side surface of the recording portion in a width direction that is a direction intersecting with the moving direction. According to this aspect, since the second rack is provided on the side surface of the recording portion in the width direction that is a direction intersecting with the moving direction, the size of the recording portion including the second rack when viewed from the width direction is restricted.

According to the third aspect, in the first or the second aspect, the moving mechanisms are provided on both sides of the recording portion in a width direction that is a direction intersecting with the moving direction.

The moving mechanism may include a third member on which a fourth rack is formed in the moving direction of the recording portion, a third pinion gear that is engaged with the fourth rack and is rotatably provided in the second member, and a fifth rack that is provided at a position facing the fourth rack in the recording portion, formed in the moving direction of the recording portion, and engaged with the third pinion gear. The second rack is provided at one side of the recording portion in a width direction that is a direction intersecting with the moving direction. The fifth rack is provided at another side of the recording portion in the width direction.

According to this aspect, since the moving mechanisms are provided on both sides of the recording portion in the width direction that is a direction intersecting with the moving direction, the moving amount in the width direction on one end side of the recording portion can be made equal to that on the other end side. As a result, the recording portion can be moved in the moving direction while appropriately maintaining the orientation of the recording portion.

According to the fourth aspect, in any one of the first to third aspects, the recording portion is configured to be attached to or removed from a device main body including the first member and the second member. According to this aspect, since the recording portion is configured to be attached to or removed from the device main body including the first member and the second member, the recording portion can be easily maintained.

According to the fifth aspect, in the fourth aspect, tooth width directions of the first rack, the second rack, and the first pinion gear extend in an attaching and removing direction of the recording portion with respect to the device main body.

Since the tooth width directions of the first rack, the second rack, and the first pinion gear extend in the attaching and removing direction of the recording portion with respect to the device main body, when the recording portion is attached or removed, engagements of the first rack, the second rack, and the first pinion gear do not interfere, and the recording portion can be easily attached or removed. In addition, even if the first pinion gear vibrates in the tooth width direction while the second member is moving, it is difficult for the vibration to be immediately transferred to the second rack, that is, the recording portion, and the recording portion can be protected from the vibration, as a result of which a failure of the recording portion can be suppressed. Note that a form in which the tooth width directions extend in the attaching and removing direction of the recording portion with respect to the device main body is not limited to a form in which the tooth width directions and the attaching and removing direction are completely parallel to each other, and a form in which the tooth width directions and the attaching and removing direction are slightly angled is included.

According to the sixth aspect, in the fourth or the fifth aspect, the recording device further includes a guide portion that guides the recording portion in an attaching and removing direction. According to this aspect, since the recording device further includes the guide portion that guides the recording portion in the attaching and removing direction, the recording portion can be attached to an appropriate position.

According the seventh aspect, in any one of the first to the sixth aspects, the recording device further includes at least one third rack that is formed in the moving direction in the second member and at least one second pinion gear that rotates by the power of the motor and is engaged with the third rack.

According to the eighth aspect, in the seventh aspect, the at least one third rack comprises a plurality of third racks and the at least one second pinion comprises a plurality of second pinion gears. The plurality of third racks and the plurality of second pinion gears are provided in a width direction that is a direction intersecting with the moving direction. According to this aspect, since, in a configuration in which the second member moves in the moving direction by a rack and pinion mechanism configured by the third racks and the second pinion gears, the pluralities of third racks and the second pinion gears are provided in the width direction that is a direction intersecting with the moving direction, the second member can be moved in the moving direction while appropriately maintaining the orientation of the second member. As a result, the recording portion can be moved in the moving direction while maintaining the orientation of the recording portion.

According to the ninth aspect, in any one of the first to the eighth aspects, the recording portion includes a first rotor at a position facing the first member, the second member includes a second rotor at a position facing the first member, and the first member includes a first guide groove into which the first rotor is fitted, and a second guide into which the second rotor is fitted. According to this aspect, the first rotor can reduce sliding resistance that occurs when the recording portion moves, and the second rotor can reduce sliding resistance that occurs when the second member moves.

According to the tenth aspect, in any one of the first to the ninth aspects, when a normal direction with respect to a mounting surface on which the recording device is mounted is set to a device height direction, a transportation path during recording, which is a path section facing the recording portion in the transportation path, is inclined with respect to the device height direction.

According to this aspect, since the transportation path during recording, which is a path section facing the recording portion in the transportation path, is inclined with respect to the device height direction, a device dimension in a direction intersecting with the device height direction can be restricted. Note that the transportation path during recording being inclined with respect to the device height direction means that the transportation path during recording is not orthogonal to the device height direction.

According to the 11th aspect, in the tenth aspect, the recording device further includes a discharge tray that is provided above the recording portion in the device height direction and forms a supporting surface for supporting a medium discharged from the transportation path, and the supporting surface extends in the moving direction of the recording portion. According to this aspect, since the supporting surface of the discharge tray extends in the moving direction of the recording portion, no wasted space is formed in the relationship between the discharge tray and the moving area of the recording portion, and the size of the device is suppressed from being increased.

According to the 12th aspect, in the tenth or the 11th aspect, the recording device further includes a liquid discharge head that constitutes the recording portion and discharges a liquid to a medium and a liquid storage portion that stores a liquid to be supplied to the liquid discharge head, and the recording portion is located between the liquid storage portion and the transportation path during recording in a first direction that is a direction along the mounting surface. According to this aspect, in a configuration in which the recording portion is located between the liquid storage portion and the transportation path during recording in the first direction that is a direction along the mounting surface, the effect of the above-described eighth or ninth aspect can be obtained.

According to the 13th aspect, in the 12th aspect, at least a part of the recording portion overlaps with the liquid storage portion in the device height direction. According to this aspect, since at least a part of the recording portion overlaps with the liquid storage portion in the device height direction, a device dimension in the device height direction can be restricted.

Hereinafter, the present disclosure will be specifically described. In the following description, an ink jet printer 1 that performs recording by discharging ink, which is an example of a liquid, with respect to a medium represented by recording paper is exemplified as the recording device. Hereinafter, the ink jet printer 1 is abbreviated as the printer 1. Note that the X-Y-Z coordinate system indicated in each figure is a rectangular coordinate system, and the Y-axis direction is a direction intersecting with the transportation direction of the medium, that is, a medium width direction and is also a device depth direction. The +Y direction of the Y-axis direction is a direction from the device front surface to the device back surface, and the −Y direction is a direction from the device back surface to the device front surface. In addition, in the present embodiment, the Y-axis direction is an example of a width direction intersecting with the V-axis direction, which is the moving direction of a head unit 50 described later.

The X-axis direction is the device width direction and is an example of a first direction that is a direction along a mounting surface G on which the printer 1 is mounted. When viewed from the operator of the printer 1, the +X direction is on the left side, and the −X side is on the right side. The Z-axis direction is the vertical direction and the normal direction with respect to the mounting surface G, that is, the device height direction. The +Z direction of the Z-axis direction is the upper direction, and the −Z direction is the lower direction. Hereinafter, the direction to which the medium is transported may be referred to as "downstream", and the opposite direction thereof may be referred to as "upstream". In addition, in each figure, a medium transportation path is indicated by a broken line. In the printer 1, the medium is transported through the medium transportation path indicated by the broken line.

In addition, the F-axis direction is a medium transportation direction between a line head 51 and a transportation belt 13, which will be described later, that is, in a recording area. The +F direction is downstream of the transportation direction and the −F direction opposite thereof is downstream of the transportation direction. In addition, the V-axis direction is the moving direction of the head unit 50, which is an example of the recording portion described later. The +V direction of the V-axis direction is a direction of the head unit 50 separating from the transportation belt 13, and the −V direction is a direction of the head unit 50 approaching the transportation belt 13. In the present embodiment, the V-axis direction is also a direction along an inclination of a discharge tray 8 described later.

As illustrated in FIG. 1, the printer 1 is a compound machine including a scanner unit 9, which is an example of an image reading device, in an upper portion of a device main body 2 for performing recording on a medium. An operation panel 7 is disposed on the front side of the device main body 2, a part of the front surface and a part of the left side surface in the upper portion of the device main body 2 are open and formed as areas for removing a medium to be discharged after recording. The discharge tray 8 supports the medium to be discharged.

A protrusion 8*a* that protrudes upward is formed in the V-axis direction in the discharge tray 8, that is, a medium discharge direction. The protrusion 8*a* is provided in a substantially central portion of the discharge tray 8 in the Y-axis direction, that is, the medium width direction. By the protrusion 8*a* disposed in this manner, the medium supported by the discharge tray 8 bends in the medium width direction, as a result of which the rigidity in the medium discharge direction improves, the medium is suppressed from curling up on the discharge tray 8, and alignment improves.

In the −V direction, that is, upstream of the medium discharge direction in the discharge tray 8, a supporting surface 8*b* that is inclined and supports the medium on each side of the protrusion 8*a* in the medium width direction is formed. In addition, in the +V direction, that is, downstream of the medium discharge direction in the discharge tray 8, a first portion 8*c* extends in the +Y direction from the protrusion 8*a*, and a second portion 8*d* extends in the −Y direction from the protrusion 8*a*. The first portion 8*c* forms a surface higher than the second portion 8*d* and extends in the V-axis direction in an inclined manner. The second portion 8*d* is a surface parallel to the horizontal direction in the present embodiment. Since the second portion 8*d* is formed in this manner, the downstream end in the medium discharge direction of the medium that has been discharged floats from the second portion 8*d* and the medium is easily removed.

At the downstream end in the medium discharge direction in the discharge tray 8, an air inlet 45 for taking in outside air is formed. Moreover, behind the operation panel 7, an air outlet 46 for exhausting air from inside the device is formed. The printer 1 can take air into the device from the air inlet 45, and the air that has been taken in passes through passages Fa, Fb, and Fc and is exhausted as indicated by an arrow Fd. By such air passages, the head unit 50 described later is cooled.

Figure 2:
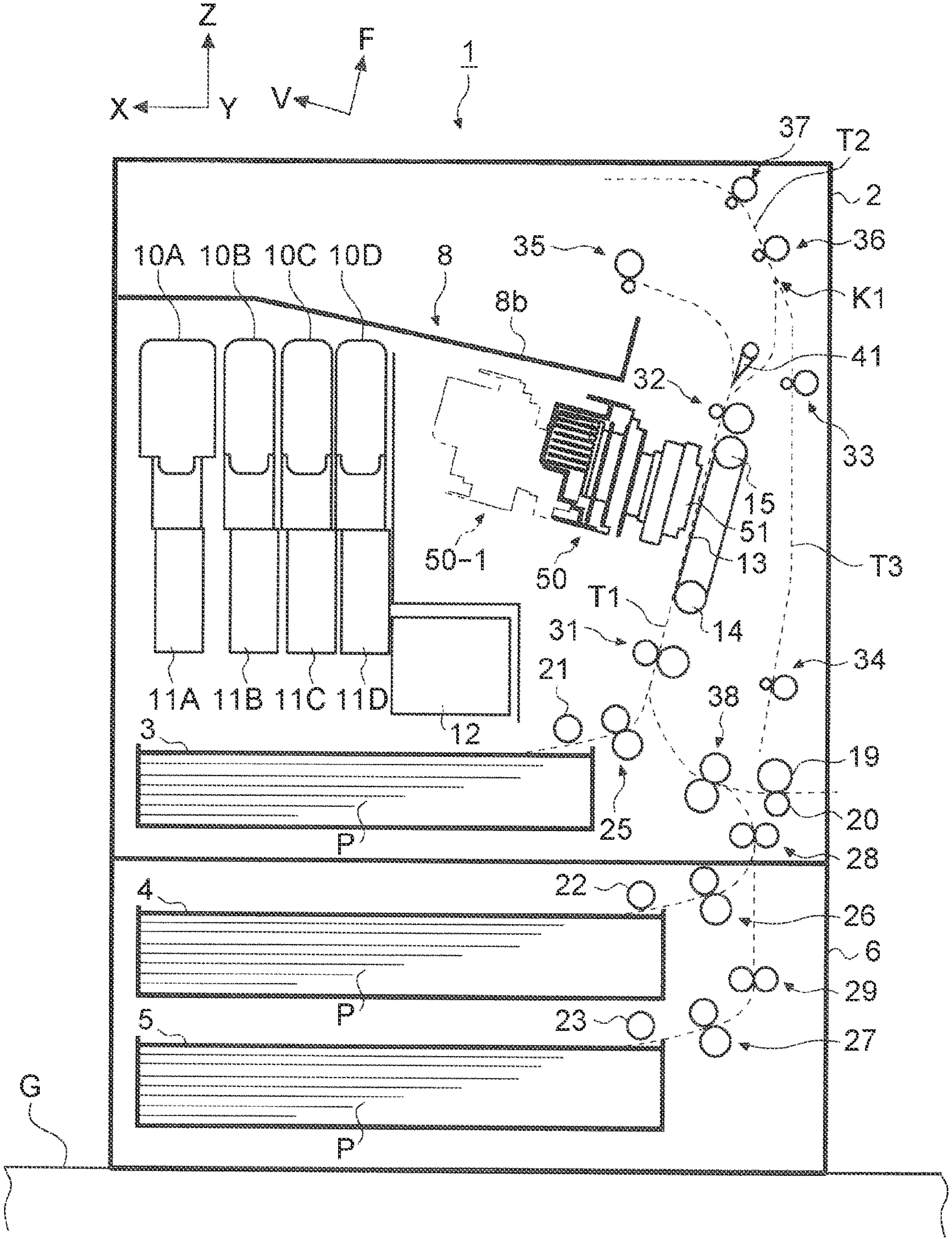
FIG. 2 is a diagram illustrating a medium transportation path.

Next, with reference to FIG. 2, a medium transportation path in the printer 1 will be described. The printer 1 is configured such that an extension unit 6 can be coupled to the lower portion of the device main body 2, and FIG. 2 illustrates a state in which the extension unit 6 is coupled. The device main body 2 includes a first medium cassette 3 for storing media in the lower position, and when the extension unit 6 is coupled, a second medium cassette 4 and a third medium cassette 5 are provided below the first medium cassette 3.

For each of the medium cassettes, a pick roller for feeding a stored medium in the −X direction is provided. Pick rollers 21, 22, and 23 are provided for the first medium cassette 3, the second medium cassette 4, and the third medium cassette 5, respectively. In addition, for each of the medium cassettes, pairs of feeding rollers for feeding, obliquely upward, the medium fed in the −X direction are provided. Pairs of feeding rollers 25, 26, and 27 are provided for the first medium cassette 3, the second medium cassette 4, and the third medium cassette 5, respectively. Note that hereinafter, "a pair of rollers" is, unless otherwise noted, configured by a driving roller driven by a motor (not illustrated) and a driven roller driven and rotated in contact with the driving roller.

The medium fed from the third medium cassette 5 is transported to a pair of transportation rollers 38 by pairs of transportation rollers 29 and 28. Moreover, the medium fed from the second medium cassette 4 is transported to the pair of transportation rollers 38 by the pair of transportation roller 28. The medium is nipped by the pair of transportation rollers 38 and transported to a pair of transportation rollers 31. The medium fed by the first medium cassette 3 is transported to the pair of the transportation rollers 31 without passing through the pair of transportation rollers 38. Note that a supply roller 19 and a separation roller 20 provided near the pair of transportation rollers 38 form a pair of rollers for feeding the medium from a supply tray not illustrated in FIG. 1.

The medium that receives a feeding force from the pair of transportation rollers 31 is transported to a position between the line head 51, which is an example of a liquid discharge head, and the transportation belt 13, that is, at a recording position facing the line head 51. Note that hereinafter, the medium transportation path from the pair of transportation rollers 31 to a pair of transportation rollers 32 is referred to as a transportation path during recording T1.

The line head 51 constitutes the head unit 50. The line head 51 executes recording by discharging ink, which is an example of the liquid, on the medium. The line head 51 is an ink discharge head configured such that a nozzle that discharges ink covers the entire area in the medium width direction and is configured as an ink discharge head capable of performing recording in the entire medium width area without moving in the medium width direction. However, the ink discharge head is not limited thereto and may be a type that discharges ink while being mounted on a carriage and moving in the medium width direction.

The head unit 50 is provided so as to be capable of advancing and retreating with respect to the transportation path during recording T1 and provided so as to be movable between a first position indicated by the solid line in FIG. 2 and a second position, as indicated by the two-dot chain line and a reference numeral 50-1 in FIG. 2, at which the head unit 50 is mostly retreated from the transportation belt 13. When the head unit 50 is at the first position, recording is performed on the medium. When the head unit 50 is at the second position, maintenance is performed on the line head 51 by a maintenance unit (not illustrated). The movement direction of the head unit 50 is the V-axis direction along the inclination of the discharge tray 8 in the present embodiment. The head unit 50 is located upstream in the medium discharge direction below the discharge tray 8 and is displaced along the lower surface of the discharge tray 8. Note that the head unit 50 may be, in the V-axis direction, provided so as to move toward a different position from the first position and the second position. Details of a moving mechanism for moving the head unit 50 to the first position and the second position will be described later.

Ink storage portions 10A, 10B, 10C, and 10D serve as liquid storage portions. Ink to be discharged from the line head 51 is supplied from each of the ink storage portions to the line head 51 via a tube (not illustrated). The ink storage portions 10A, 10B, 10C, and 10D are provided so as to be attached to or removed from mounting portions 11A, 11B, 11C, and 11D, respectively. In addition, a waste liquid storage portion 12 stores ink as a waste liquid that has been discharged from the line head 51 toward a flushing cap (not illustrated) for maintenance.

The transportation belt 13 is an endless belt stretched between a pulley 14 and a pulley 15 and is rotated as at least one of the pulley 14 and the pulley 15 is driven by a motor (not illustrated). The medium is transported at a position facing the line head 51 while being sucked onto a belt surface of the transportation belt 13. Suction of the medium onto the transportation belt 13 can adopt a known sucking system such as an air suction system and an electrostatic clinging system.

Here, the transportation path during recording T1 that passes through the position facing the line head 51 is inclined with respect to both of the X-axis direction and the Z-axis direction and transports the medium upward. In other words, the transportation path during recording T1 is not parallel to the Z-axis direction and is not orthogonal to the Z-axis direction. This upward transportation direction is a direction including a –X direction component and a +Z direction component in FIG. 1, and according to this configuration, the dimension of the printer 1 in the X-axis direction can be restricted. Note that in the present embodiment, the inclination angle of the transportation path during recording T1 is set within a range from 35° to 5° with respect to the Z-axis direction, that is, the device height direction, and more specifically, is set to an inclination angle of substantially 15°. As a result, the head unit 50 is located between the ink storage portions 10A to 10D and the transportation path during recording T1 in the X-axis direction.

In addition, the present disclosure includes the discharge tray 8 that is provided in the +Z direction from the head unit 50 and forms the supporting surface 8*b* for supporting the medium discharged from the medium transportation path, and the supporting surface 8*b* extends in the V-axis direction, which is the moving direction of the head unit 50. As a result, no wasted space is formed in the relationship between the discharge tray 8 and the moving area of the head unit 50, and the size of the device is suppressed from being increased. In addition, since a part of the head unit 50 overlaps with the ink storage portions 10A to 10D in the Z-axis direction, the device dimension in the Z-axis direction can be restricted.

Next, the medium on which recording has been performed on a first surface by the line head 51 is transported further upward by the pair of transportation rollers 32 located downstream of the transportation belt 13. A flap 41 is provided downstream of the pair of transportation rollers 32, and the flap 41 switches the transportation direction of the medium. When the medium is discharged as it is, the flap 41 switches the transportation path of the medium such that the medium is transported upward toward a pair of transportation rollers 35, and the medium is discharged toward the discharge tray 8 by the pair of transportation rollers 35.

When recording is performed on a second surface in addition to the first surface of the medium, the transportation direction of the medium is directed toward a branching position K1 by the flap 41. Next, the medium passes through the branching position K1 and enters a switch-back path T2. In the present embodiment, the switch-back path T2 is a medium transportation path above the branching position K1. Pairs of transportation rollers 36 and 37 are provided in the switch-back path T2. The medium that has entered the switch-back path T2 is transported upward by the pairs of transportation rollers 36 and 37, and after the lower edge of the medium passes through the branching position K1, the rotation direction of the pairs of transportation rollers 36 and 37 is switched, as a result of which the medium is transported downward.

A reverse path T3 is coupled to the switch-back path T2. In the present embodiment, the reverse path T3 is a medium transportation path from the branching position K1 to the pair of transportation rollers 38 through pairs of transportation rollers 33 and 34. The medium that has been transported downward from the branching position K1 receives a transportation force from the pairs of transportation rollers 33 and 34, reaches the pair of transportation rollers 38, is curved and reversed, and transported to the pair of transportation rollers 31

After the medium is transported to a position facing the line head 51 again, the second surface of the medium on the opposite side of the first surface on which recording has already been performed faces the line head 51. As a result, recording on the second surface of the medium can be performed by the line head 51.

Figure 3:
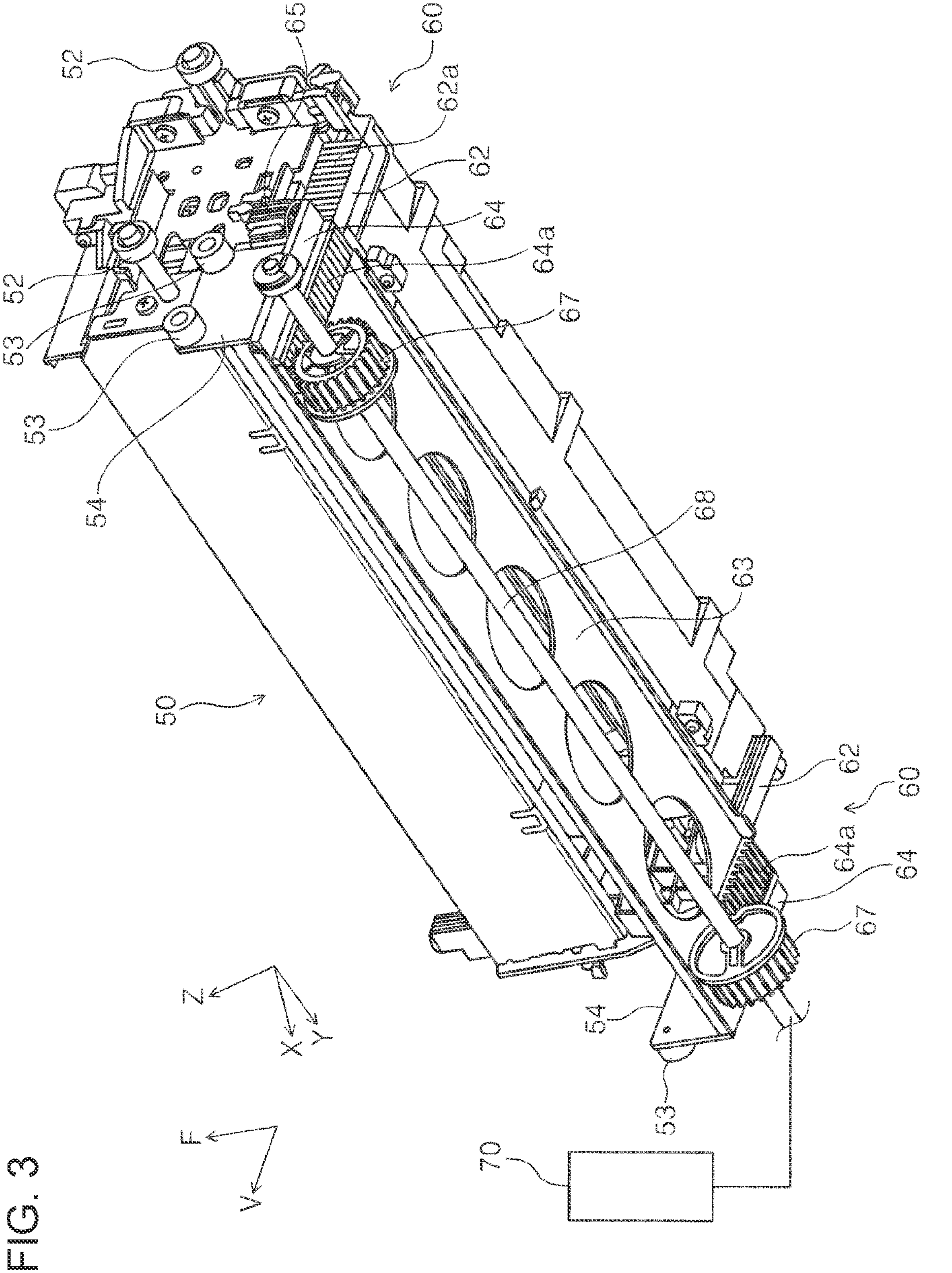
FIG. 3 is a perspective view of a head unit and a moving mechanism and illustrates a state in which the head unit is at a first position.
Figure 4:
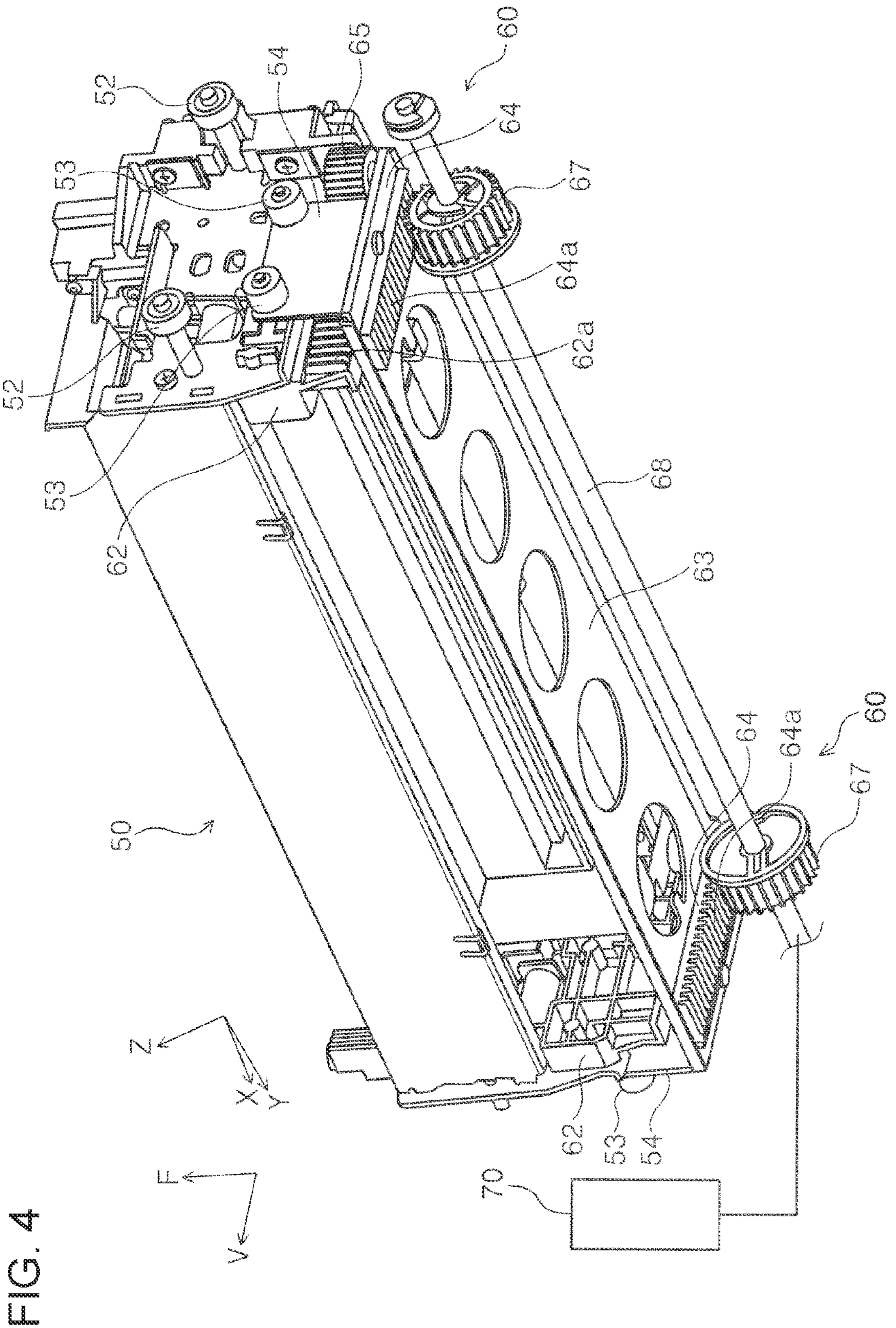
FIG. 4 is a perspective view of the head unit and the moving mechanism and illustrates a state in which the head unit is at a second position.
Figure 5:
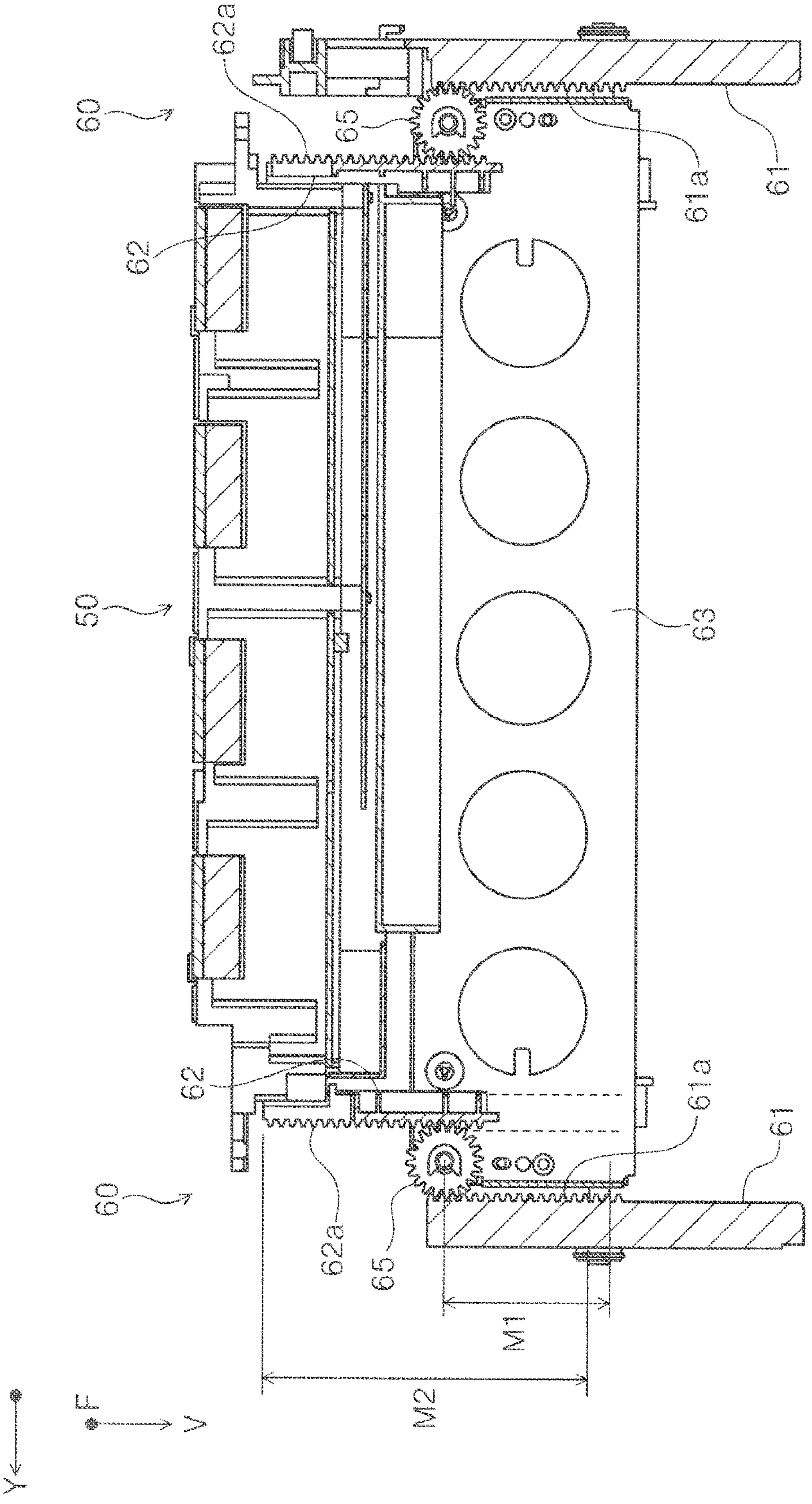
FIG. 5 is a sectional view of the head unit and the moving mechanism and illustrates a state in which the head unit is at the first position.
Figure 6:
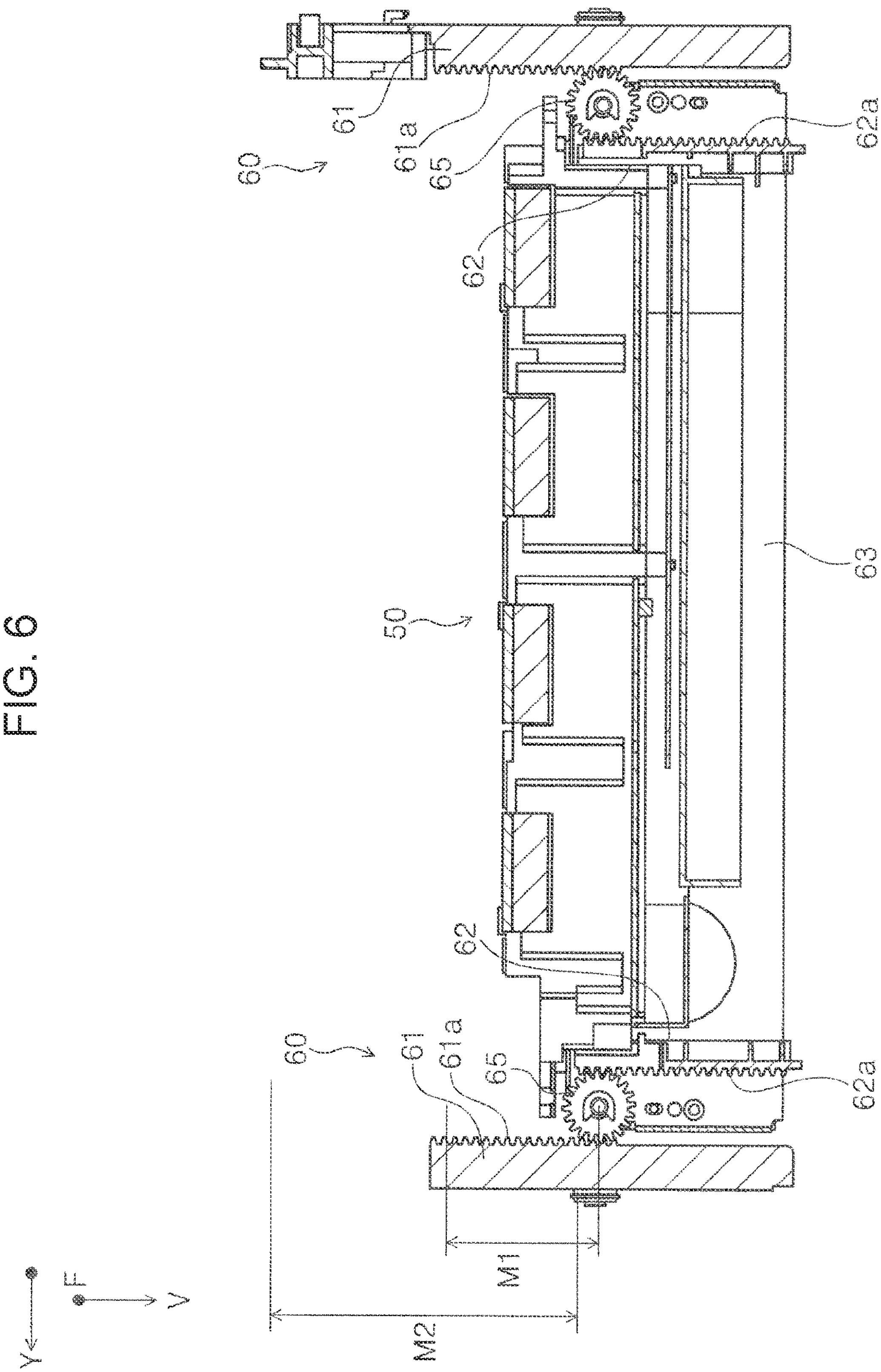
FIG. 6 is a sectional view of the head unit and the moving mechanism and illustrates a state in which the head unit is at the second position.

Subsequently, the moving mechanism for moving the head unit 50 in the V-axis direction will be described with reference to FIG. 3 and the following figures. Note that in FIGS. 3 and 4, a first member 61 illustrated in FIGS. 5 and 6 is omitted, and a side surface of the head unit 50 is clearly illustrated. In FIGS. 3 to 6, a moving mechanism 60 includes the first member 61, a second rack forming member 62, a second member 63, a third rack forming member 64, a first pinion gear 65, and a second pinion gear 67. In the present embodiment, the moving mechanism 60 is provided on each side in the Y-axis direction intersecting with the V-axis direction with respect to the head unit 50.

Figure 9:
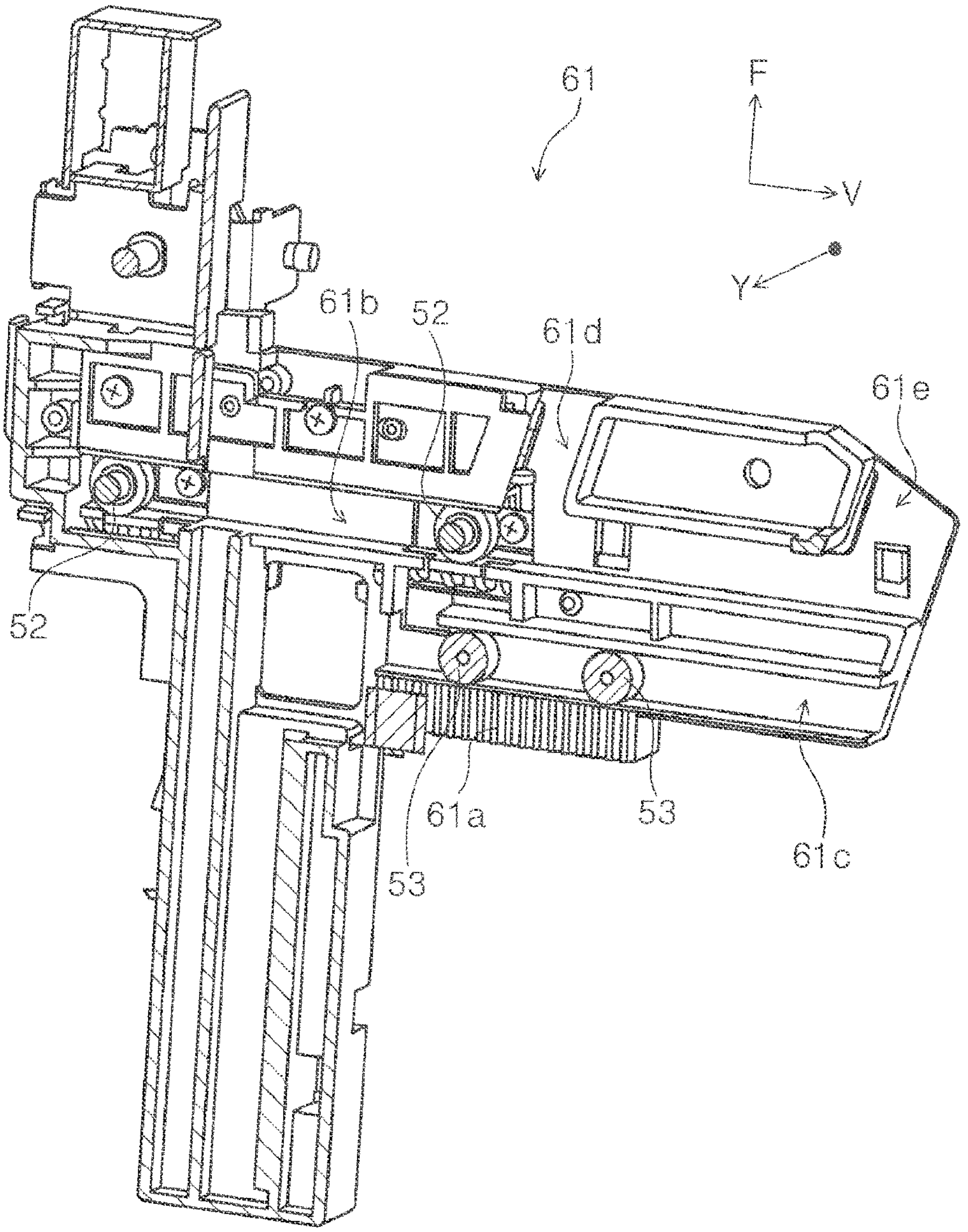
FIG. 9 is a sectional perspective view of a part of a first member and the head unit when the head unit is at the first position.
Figure 10:
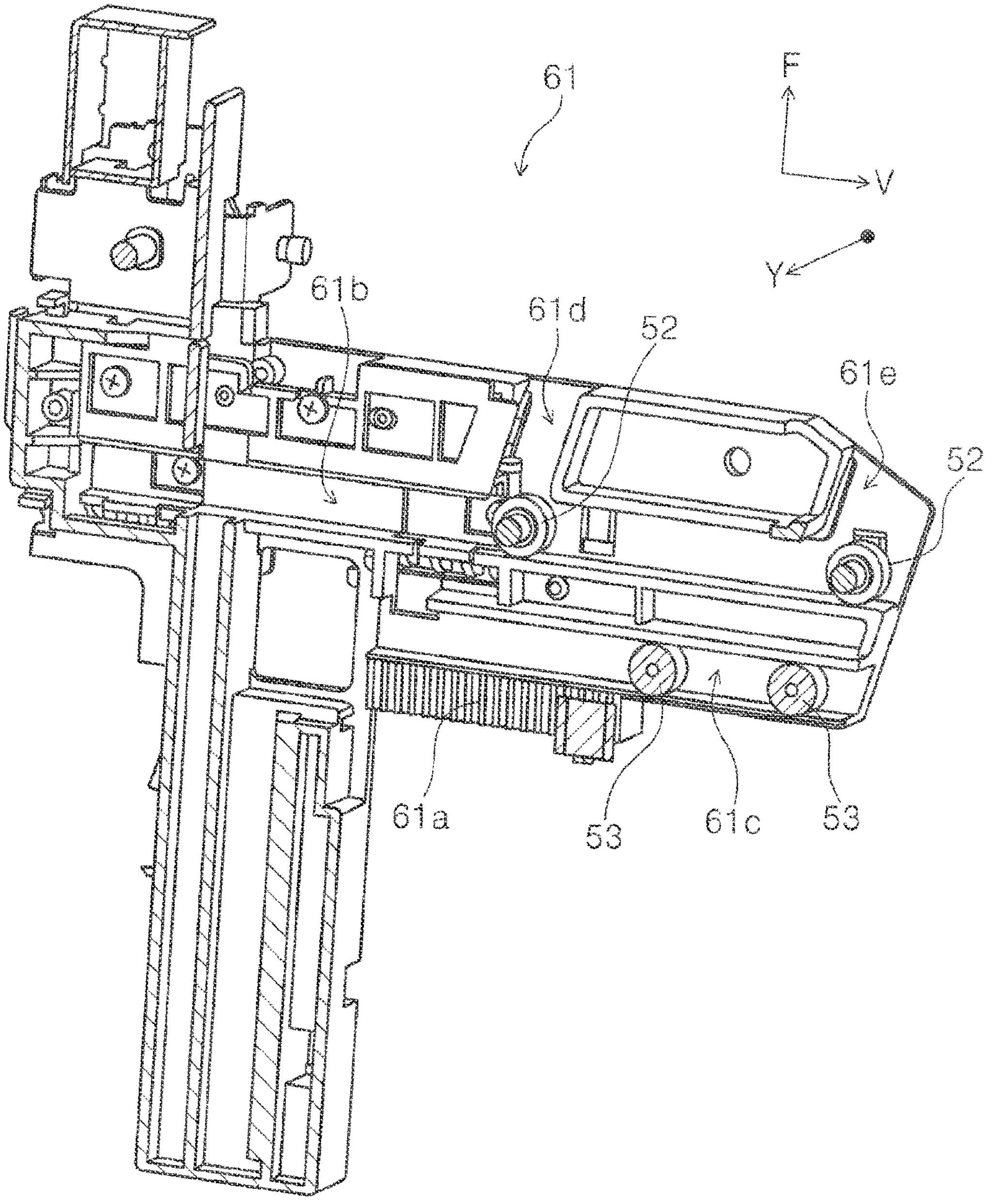
FIG. 10 is a sectional perspective view of a part of the first member and the head unit when the head unit is at the second position.

The first member 61 is provided in a fixed manner with respect to a frame (not illustrated) of the device at a position facing a side surface of the head unit 50 in the Y-axis direction. On the side facing the head unit 50, a first rack 61*a* is provided in the V-axis direction (see also FIGS. 9 and 10). Moreover, in the first member 61, a first guide groove 61*b* and a second guide groove 61*c* that extend in the V-axis direction as illustrated in FIGS. 9 and 10 are formed. On the side surface in the Y-axis direction of the head unit 50, that is, the side surface facing the first member 61, as illustrated in FIGS. 3 and 4, two upper rollers 52 are disposed with a space therebetween in the V-axis direction. The upper rollers 52 are examples of the first rotor. As illustrated in FIGS. 9 and 10, the two upper rollers 52 are fitted into the first guide groove 61*b* of the first member 61, as a result of which the head unit 50 is guided in the V-axis direction by the first member 61. Moreover, by the rotation of the upper rollers 52, sliding resistance that occurs when the head unit 50 moves is reduced.

Next, the second rack forming member 62 is provided at an end portion in the Y-axis direction of the head unit 50, and a second rack 62*a* is formed on the second rack forming member 62 in the V-axis direction. As illustrated in FIGS. 5 and 6, while the first rack 61*a* and the second rack 62*a* face each other, the first pinion gear 65 is disposed between the first rack 61*a* and the second rack 62*a* and is engaged with both of the first rack 61*a* and the second rack 62*a*.

The first pinion gear 65 is rotatably provided in the second member 63. On a side surface of the second member 63 in the Y-axis direction, as illustrated in FIGS. 3 and 4, two lower rollers 53 are disposed with a space therebetween in the Y-axis direction. The lower rollers 53 are examples of the second rotor. The lower rollers 53 are supported by a lower roller supporting member 54 fixed to the second member 63. The two lower rollers 53 are fitted into the second guide groove 61*c* (see FIGS. 9 and 10) of the first member 61. As a result, the second member 63 is guided in the V-axis direction by the first member 61. Moreover, by the rotation of the lower rollers 53, sliding resistance that occurs when the second member 63 moves is reduced.

Below the second member 63, as illustrated in FIGS. 3 and 4, the third rack forming member 64 is provided, and a third rack 64*a* is formed on the third rack forming member 64 in the V-axis direction. The second pinion gear 67 is engaged with the third rack 64*a*. Note that the third rack forming member 64 is provided at each end portion in the Y-axis direction on the lower surface of the second member 63. In addition, the second pinion gear 67 is provided at a position facing the third rack 64*a* in a rotation shaft 68 having a rotation axis center parallel to the Y-axis direction, and the two second pinion gears 67 are configured so as to simultaneously rotate by the rotation of the rotation shaft 68. Note that power of a motor 70 is transferred to the rotation shaft 68 via a gear mechanism not illustrated in FIGS. 3 and 4.

In the above configuration, when the second pinion gears 67 rotate, the second member 63 moves in the V-axis direction. Here, since the first member 61, that is, the first rack 61*a* is provided in a fixed manner, the first pinion gear 65 provided in the second member 63 that moves in the V-axis direction rotates based on its engagement with the first rack 61*a*.
Since the first pinion gear 65 is engaged with the second rack 62*a* provided on the head unit 50, by the rotation of the first pinion gear 65, the head unit 50 moves as if the head unit 50 were pushed out in the V-axis direction.

For example, when the second member 63 moves in the +V direction while the head unit 50 is at the first position as illustrated in FIG. 5, the first pinion gear 65 on the right side of FIG. 5 rotates counterclockwise in FIG. 5, and the first pinion gear 65 on the left side of FIG. 5 rotates clockwise in FIG. 5. As a result, the head unit 50 is moved in the +V direction.

Moreover, when the second member 63 moves in the −V direction while the head unit 50 is at the second position as illustrated in FIG. 6, the first pinion gear 65 on the right side of FIG. 6 rotates clockwise in FIG. 6, and the first pinion gear 65 on the left side of FIG. 6 rotates counterclockwise in FIG. 6. As a result, the head unit 50 is moved in the −V direction.

Here, a moving range M1 in the V-axis direction in FIGS. 5 and 6 is the moving range of the second member 63 with the rotation axis center of the first pinion gear 65 as the reference. In addition, a moving range M2 in the V-axis direction in FIGS. 5 and 6 is the moving range of the head unit 50 with the −V direction end portion position of the second rack forming member 62 as the reference. As described above, although the head unit 50 moves in the V-axis direction by the rotation of the first pinion gear 65, since the first pinion gear 65 itself also moves in the V-axis direction, the moving range M2 of the head unit 50 becomes larger than the moving range M1 of the second member 63. In the present embodiment, the moving range M2 is twice as large as the moving range M1.

As described above, the moving mechanism 60 moves, by the power of the motor 70 in the V-axis direction, the head unit 50 capable of moving between the first position at which the head unit 50 advances to the transportation path for transporting the medium and performs recording on the medium to be transported and the second position at which the head unit 50 retreats from the transportation path. The moving mechanism 60 includes the first member 61 on which the first rack 61*a* is formed in the moving direction of the head unit 50, the first pinion gear 65 that is engaged with the first rack 61*a*, the second rack 62*a* that is provided at a position facing the first rack 61*a* in the head unit 50, formed in the V-direction, which is the moving direction of the head unit 50, and engaged with the first pinion gear 65, and the second member 63 in which the first pinion gear 65 is rotatably provided that is configured to move in the V-direction by receiving the power of the motor 70. By the rotation of the first pinion gear 65 that moves in the V-axis direction, the moving amount of the head unit 50 becomes larger than the moving amount of the second member 63. In other words, since the moving amount of the head unit 50 can be ensured while the moving amount of the second member 63 is restricted, the size of the mechanism for moving the second member 63 can be suppressed from being increased, and specifically, in the present embodiment, the length of the third rack 64*a* in the V-axis direction can be restricted. As a result, the size of the printer 1 can be suppressed from being increased.

Note that in the present embodiment, although the first member 61 on which the first rack 61*a* is formed is provided in a fixed manner with respect to the frame (not illustrated) of the device, a rack and pinion mechanism in which the first member 61 is provided so as to be movable in the V-axis direction and the first member 61 is moved in the V-axis direction may be separately provided. As a result, the moving range of the head unit 50 can be further expanded. Alternatively, the first pinion gear 65 may have a two-stage structure of a main gear and a sub-gear. More specifically, after the number of teeth of the sub-gear is made larger than the number of teeth of the main gear, the main gear is engaged with the first rack 61*a*, and the sub-gear is engaged with the second rack 62*a*. By such a configuration, the moving amount of the second rack 62*a* with respect to the rotation of the first pinion gear 65 can be further increased, and the moving area of the head unit 50 can be further expanded.

In addition, in the present embodiment, since the second rack 62*a* is provided on a side surface of the head unit 50 in the Y-axis direction, which is a direction intersecting with the V-axis direction, the size of the head unit 50 including the second rack 62*a* when viewed from the Y-axis direction can be restricted.

In addition, the moving mechanism 60 is provided on each side of the head unit 50 in the Y-axis direction, the moving amount in the V-axis direction on one end side and the other end side of the head unit 50 in the Y-axis direction can be made equal. As a result, the head unit 50 can be moved in the V-axis direction while the orientation of the head unit 50 is appropriately maintained.

Next, the head unit 50 is configured to be attached to or removed from the device main body 2 including the first member 61 and the second member 63. In FIGS. 9 and 10, a third guide groove 61*d* and a fourth guide groove 61*e* are formed in the first member 61, and the upper rollers 52 provided on a side surface in the Y-axis direction of the head unit 50 can slip upward from the first guide groove 61*b* through the third guide groove 61*d* and the fourth guide groove 61*e*. That is, the head unit 50 can be removed from the first member 61. In addition, by putting the head unit 50 into the first member 61, the upper rollers 52 can be fitted into the first guide groove 61*b*, in other words, the head unit 50 can be attached. The third guide groove 61*d* and the fourth guide groove 61*e* function as guide portions for guiding the head unit 50 in the attaching and removing direction. In this manner, since the head unit 50 can be attached to or removed from the device main body 2, the head unit 50 can be easily maintained and replaced.

Figure 7:
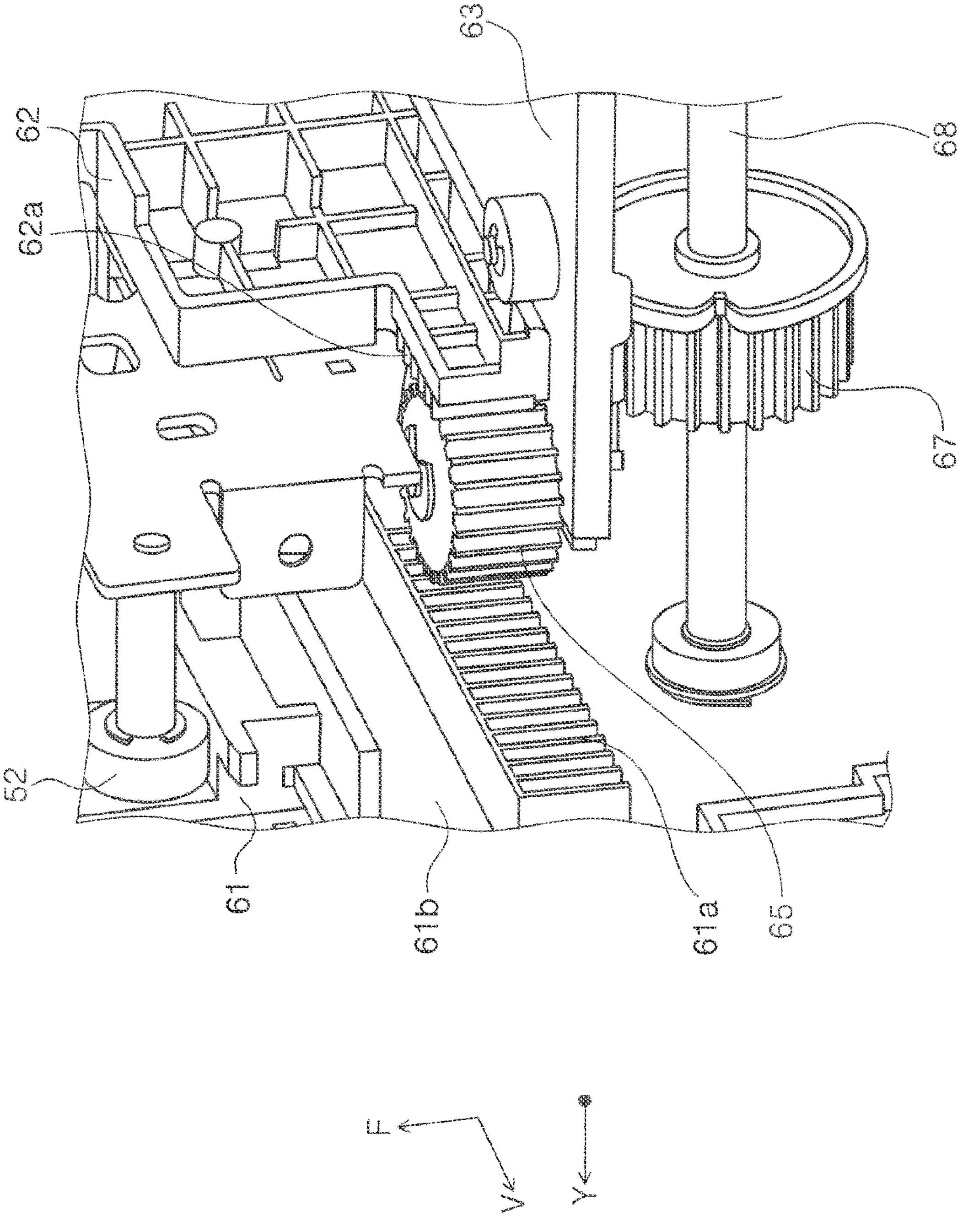
FIG. 7 is a partially enlarged perspective view of a first rack, a second rack, and a second pinion gear when the head unit is at the second position.
Figure 8:
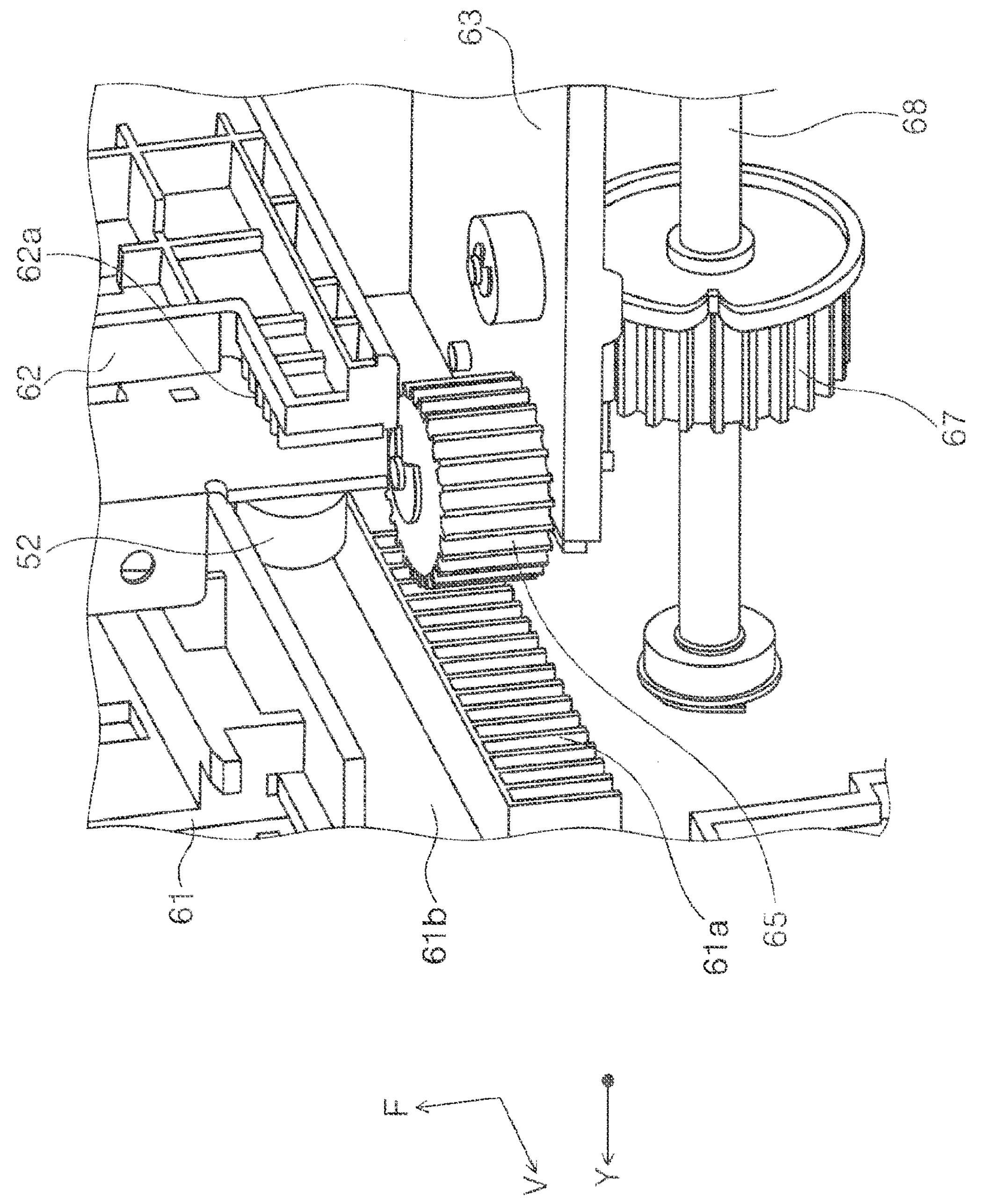
FIG. 8 is a partially enlarged perspective view of the first rack, the second rack, and the second pinion gear in a process of removing the head unit.

In addition, tooth width directions of the first rack 61*a*, the second rack 62*a*, and the first pinion gear 65 extend in the attaching and removing direction (F-axis direction) of the head unit 50 as illustrated in FIGS. 7 and 8. As a result, when the head unit 50 is attached or removed, engagements of the first rack 61*a*, the second rack 62*a*, and the first pinion gear 65 do not interfere, and the head unit 50 can be easily attached or removed as illustrated in FIG. 8. In addition, even when the first pinion gear 65 vibrates in the tooth width direction when the second member 63 moves, it is difficult for the vibration to be immediately transferred to the second rack 62*a*, that is, the head unit 50, the head unit 50 can be protected from the vibration, and a failure of the head unit 50 can be suppressed. Note that the tooth width directions of the first rack 61*a*, the second rack 62*a*, and the first pinion gear 65 are not limited to being completely parallel to the attaching and removing direction (F-axis direction) of the head unit 50, and the tooth width directions and the attaching and removing direction may be slightly angled.

In addition, in the present embodiment, since the third guide groove 61*d* and the fourth guide groove 61*e* illustrated in FIGS. 9 and 10 function as guide portions for guiding the head unit 50 in the attaching and removing direction, the head unit 50 can be attached to an appropriate position.

In addition, as illustrated in FIGS. 3 and 4, since pluralities of the third racks 64*a* and the second pinion gears 67 are provided in the Y-axis direction, the second member 63 can be moved in the V-axis direction while the orientation of the second member 63 is appropriately maintained. As a result, the head unit 50 can be moved while the orientation of the head unit 50 is appropriately maintained.

Figure 11:
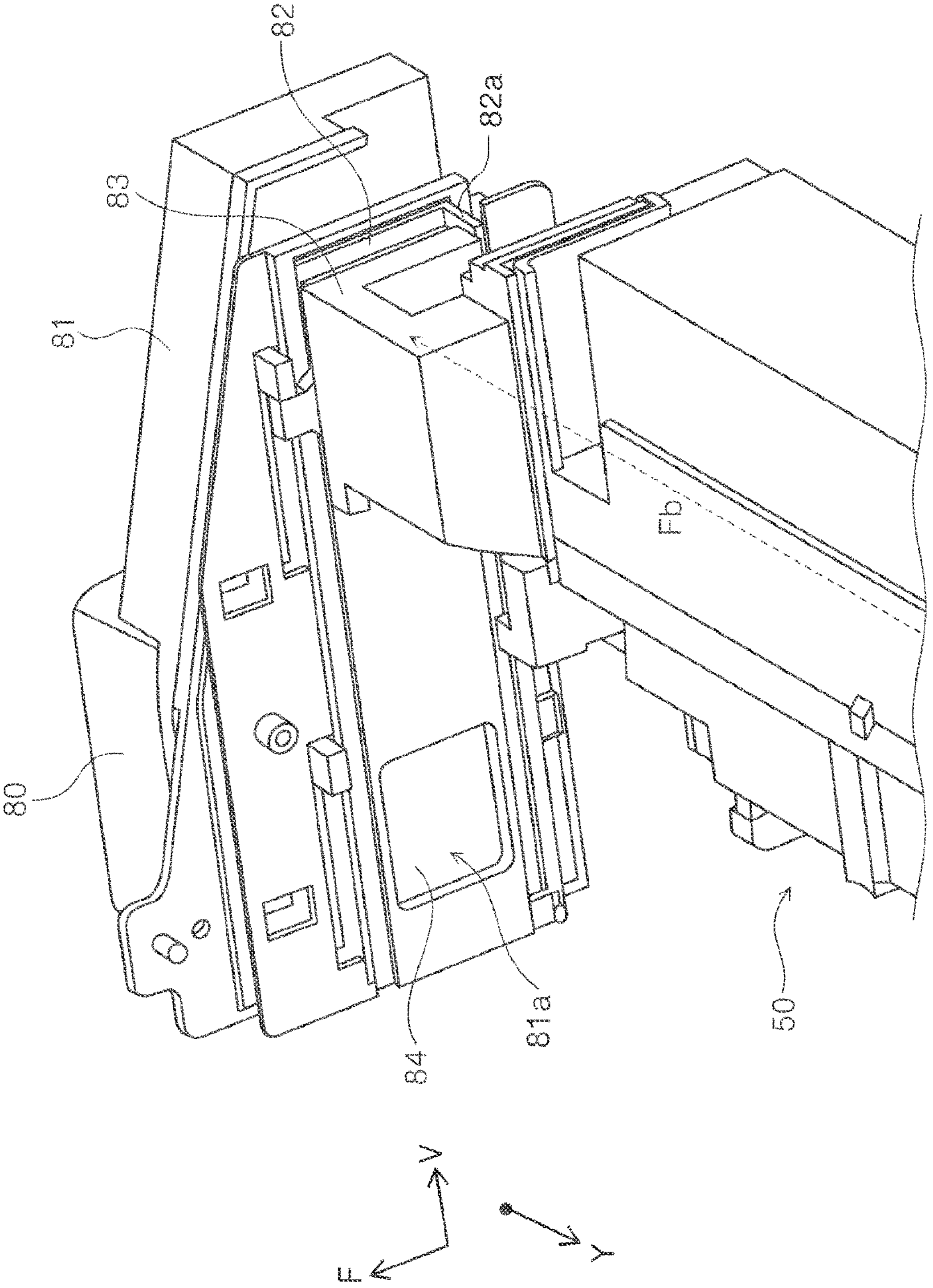
FIG. 11 is a perspective view illustrating positional relationships between a suction fan, a duct, and the head unit when the head unit is at the second position.
Figure 12:
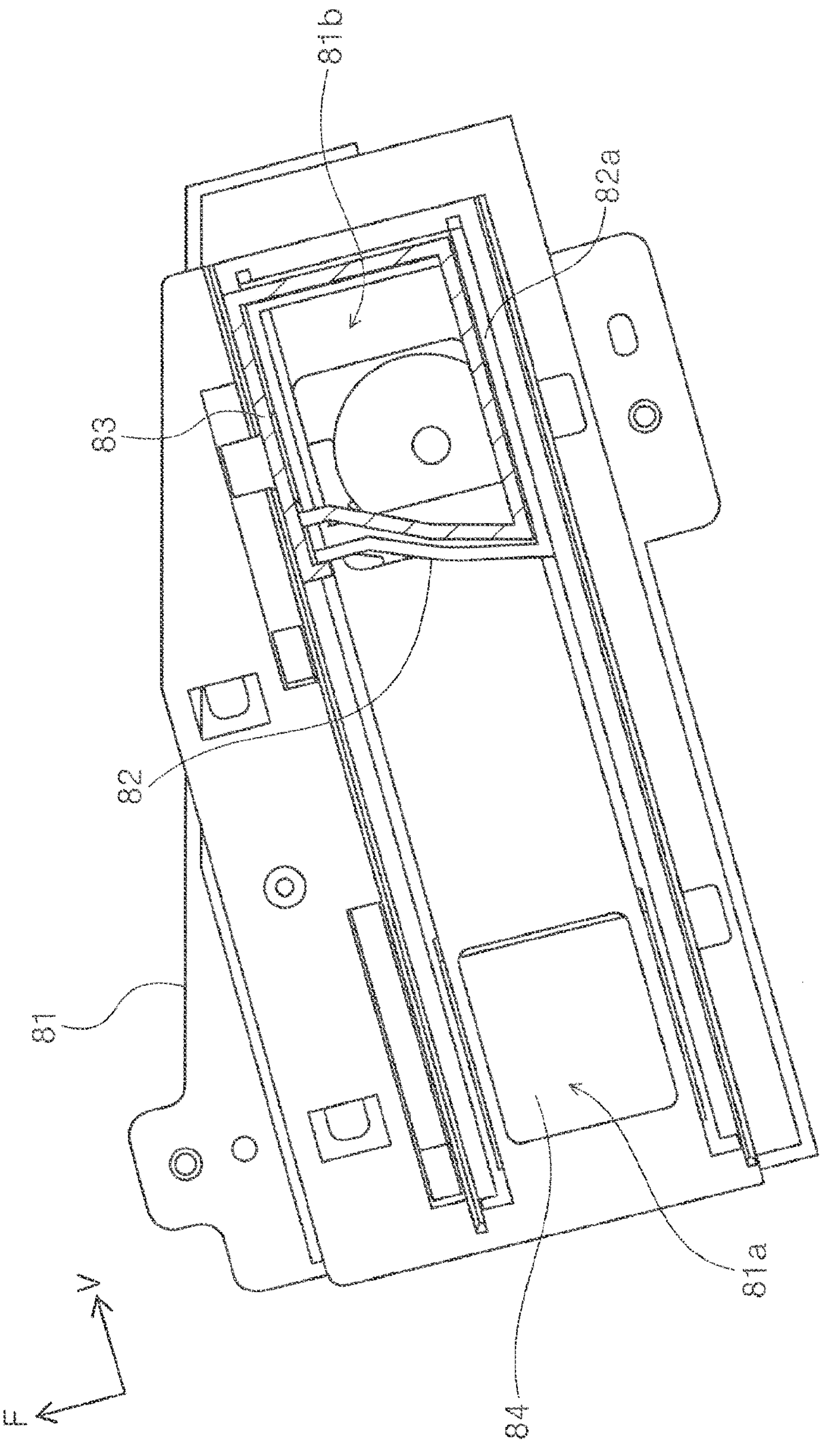
FIG. 12 is a sectional view illustrating a positional relationship between the duct and the head unit when the head unit is at the second position.
Figure 13:
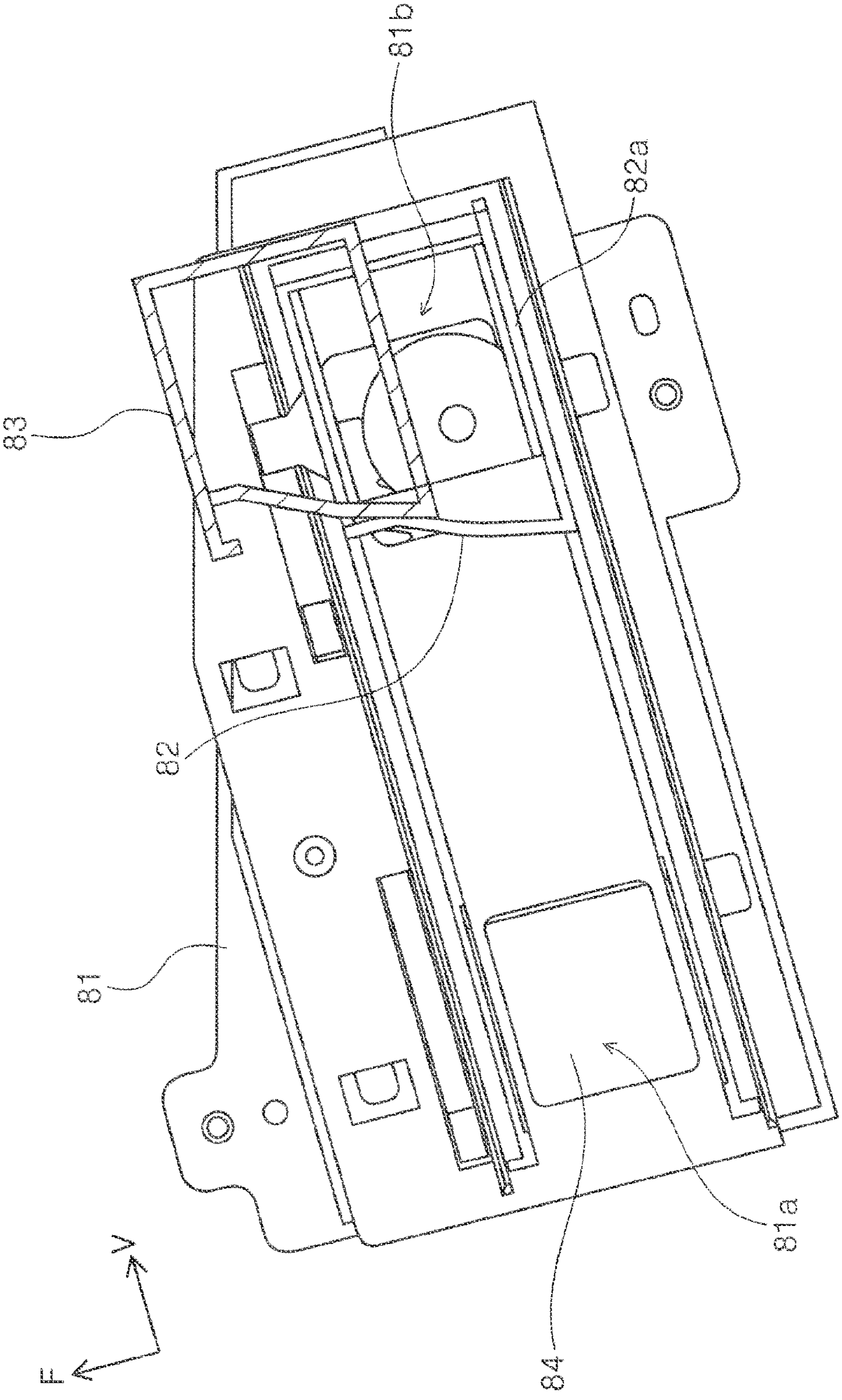
FIG. 13 is the sectional view illustrating a positional relationship between the duct and the head unit in a process of removing the head unit.

Note that although the air passages described with reference to FIG. 1 are formed by a suction fan 80 illustrated in FIG. 11, since, as described above, the head unit 50 can be attached or removed in the F-axis direction while moving in the V-axis direction, the structure of a duct 81 interposed between the suction fan 80 and the head unit 50 is designed as described below. In FIGS. 11 to 13, a first opening 81*a* and a second opening 81*b* are formed in the duct 81 with a space therebetween in the V-axis direction.

The first opening 81*a* is coupled to the end portion in the −Y direction of the head unit 50 when the head unit 50 is at the first position. As a result, the passage Fb is formed when the head unit 50 is at the first position. In addition, the second opening 81*b* is coupled to the end portion in the −Y direction of the head unit 50 when the head unit 50 is at the second position. As a result, the passage Fb is formed when the head unit 50 is at the second position.

The first opening 81*a* is provided with a shutter 84 for closing the first opening 81*a* when the head unit 50 is at the second position. As a result, when the head unit 50 is at the second position, outside air is prevented from being taken into the duct 81 from the first opening 81*a*. Note that the shutter 84 is linked with the movement of the head unit 50, and when the head unit 50 is at the first position, the shutter 84 moves to a position at which the shutter 84 does not close the first opening 81*a*.

Next, a first coupling member 82 is provided in the duct 81, and a second coupling member 83 is provided in the head unit 50. When the head unit 50 is attached, the first coupling member 82 is coupled to the second coupling member 83, and in response to the movement of the head unit 50 in the V-axis direction, both of the first coupling member 82 and the second coupling member 83 move in the V-axis direction. A receiving portion 82*a* receives the second coupling member 83 and is formed so as to protrude in the +Y direction.

The receiving portion 82*a* is formed in the −F direction in the first coupling member 82 and is not formed in the +F direction. Accordingly, when the head unit 50 is at the second position, even when the head unit 50 is lifted in the +F direction to be removed as illustrated in the change from FIG. 12 to FIG. 13, the head unit 50 can be removed while the second coupling member 83 does not interfere with the first coupling member 82.

Note that the lower roller supporting member 54 in which the lower rollers 53 are provided is provided at a position facing the first member 61 between the first member 61 and the side surface of the head unit 50 in the Y-axis direction. As illustrated in FIGS. 3 and 4, an assembly formed of the second member 63 and the lower roller supporting member 54 form a so-called U-shape when viewed from the V-axis direction. A part of the head unit 50 is fitted into the U-shape of the assembly formed by the second member 63 and the lower roller supporting member 54. As a result, the size of the device main body 2 in the F-axis direction and the Z-axis direction can be restricted. Moreover, when the second member 63 moves, the head unit 50 can be stably moved.

The present disclosure is not limited to the embodiments described above, and various modifications can be made within the scope of the disclosure described in the scope of the claims, and it is needless say that the modifications are also included in the scope of the present disclosure.

What is claimed is:

1. A recording device comprising:

a transportation path that transports a medium;

a recording portion configured to move with respect to the transportation path in a direction intersecting with a recording surface of the medium;

a moving mechanism that moves the recording portion in a moving direction; and a motor that causes the recording portion to move by transferring power to the moving mechanism, wherein the moving mechanism includes a first member on which a first rack is formed in the moving direction of the recording portion, a first pinion gear that is engaged with the first rack, a rack forming member in the recording portion, the rack forming member having a second rack that is formed at a position facing the first rack, the second rack being formed in the moving direction of the recording portion, and the second rack being engaged with the first pinion gear, and a second member configured to move in the moving direction by receiving the power of the motor, the first pinion gear being rotatably provided in the second member.

2. The recording device according to claim 1, wherein the second rack is provided on a side surface of the recording portion in a width direction that is a direction intersecting with the moving direction.

3. The recording device according to claim 1, wherein the moving mechanism are provided on both sides of the recording portion in a width direction that is a direction intersecting with the moving direction.

4. The recording device according to claim 1, wherein the moving mechanism includes a third member on which a fourth rack is formed in the moving direction of the recording portion, a third pinion gear that is engaged with the fourth rack and is rotatably provided in the second member, and a fifth rack that is provided at a position facing the fourth rack in the recording portion, formed in the moving direction of the recording portion, and engaged with the third pinion gear, the second rack is provided at one side of the recording portion in a width direction that is a direction intersecting with the moving direction, and the fifth rack is provided at another side of the recording portion in the width direction.

5. The recording device according to claim 4, further comprising:

at least one third rack that is formed in the moving direction in the second member; and at least one second pinion gear that rotates by the power of the motor and is engaged with the third rack.

6. The recording device according to claim 1, wherein the recording portion is configured to be attached to or removed from a device main body including the first member and the second member.

7. The recording device according to claim 6, wherein tooth width directions of the first rack, the second rack, and the first pinion gear extend in an attaching and removing direction of the recording portion with respect to the device main body.

8. The recording device according to claim 6, further comprising a guide portion that guides the recording portion in an attaching and removing direction.

9. The recording device according to claim 1, further comprising:

at least one third rack that is formed in the moving direction in the second member; and at least one second pinion gear that rotates by the power of the motor and is engaged with the third rack.

10. The recording device according to claim 9, wherein the at least one third rack comprises a plurality of third racks, the at least one second pinion gear comprises a plurality of second pinion gears, and the plurality of third racks and the plurality of second pinion gears are provided in a width direction that is a direction intersecting with the moving direction.

11. The recording device according to claim 1, wherein the recording portion includes a first rotor at a position facing the first member, the second member includes a second rotor at a position facing the first member, and the first member includes a first guide groove into which the first rotor is fitted, and a second guide groove into which the second rotor is fitted.

12. The recording device according to claim 1, wherein when a normal direction with respect to a mounting surface on which the recording device is mounted is set to a device height direction, a transportation path during recording, which is a path section facing the recording portion in the transportation path, is inclined with respect to the device height direction.

13. The recording device according to claim 12, further comprising a discharge tray that is provided above the recording portion in the device height direction and forms a supporting surface for supporting a medium discharged from the transportation path, wherein the supporting surface extends in the moving direction of the recording portion.

14. The recording device according to claim 12, further comprising:

a liquid discharge head that constitutes the recording portion and discharges a liquid to a medium; and a liquid storage portion that stores a liquid to be supplied to the liquid discharge head, wherein the recording portion is located between the liquid storage portion and the transportation path during recording in a first direction that is a direction along the mounting surface.

15. The recording device according to claim 14, wherein at least a part of the recording portion overlaps with the liquid storage portion in the device height direction.

16. A recording device comprising:

a transportation path that transports a medium;

a recording portion configured to move with respect to the transportation path in a direction intersecting with a recording surface of the medium;

a moving mechanism that moves the recording portion; and a motor that causes the recording portion to move by transferring power to the moving mechanism, wherein the moving mechanism includes a first member on which a first rack is formed in a moving direction of the recording portion, a first pinion gear that is engaged with the first rack, a second rack that is provided at a position facing the first rack in the recording portion, formed in the moving direction of the recording portion, and engaged with the first pinion gear, a second member in which the first pinion gear is rotatably provided that is configured to move in the moving direction by receiving the power of the motor, at least one third rack that is formed in the moving direction in the second member, and at least one second pinion gear that rotates by the power of the motor and is engaged with the at least one third rack.

17. A recording device comprising:

a transportation path that transports a medium;

a recording portion configured to move with respect to the transportation path in a direction intersecting with a recording surface of the medium;

a moving mechanism that moves the recording portion; and a motor that causes the recording portion to move by transferring power to the moving mechanism, wherein the moving mechanism includes a first member on which a first rack is formed in a moving direction of the recording portion, a first pinion gear that is engaged with the first rack, a second rack that is provided at a position facing the first rack in the recording portion, formed in the moving direction of the recording portion, and engaged with the first pinion gear, and a second member in which the first pinion gear is rotatably provided that is configured to move in the moving direction by receiving the power of the motor, wherein when a normal direction with respect to a mounting surface on which the recording device is mounted is set to a device height direction, a path during recording, which is a path section facing the recording portion in the transportation path, is inclined with respect to the device height direction.

* * * * *